Nov. 21, 1967  R. F. ANDERSON  3,353,527
GRILLING APPARATUS
Filed Oct. 21, 1965  3 Sheets-Sheet 1
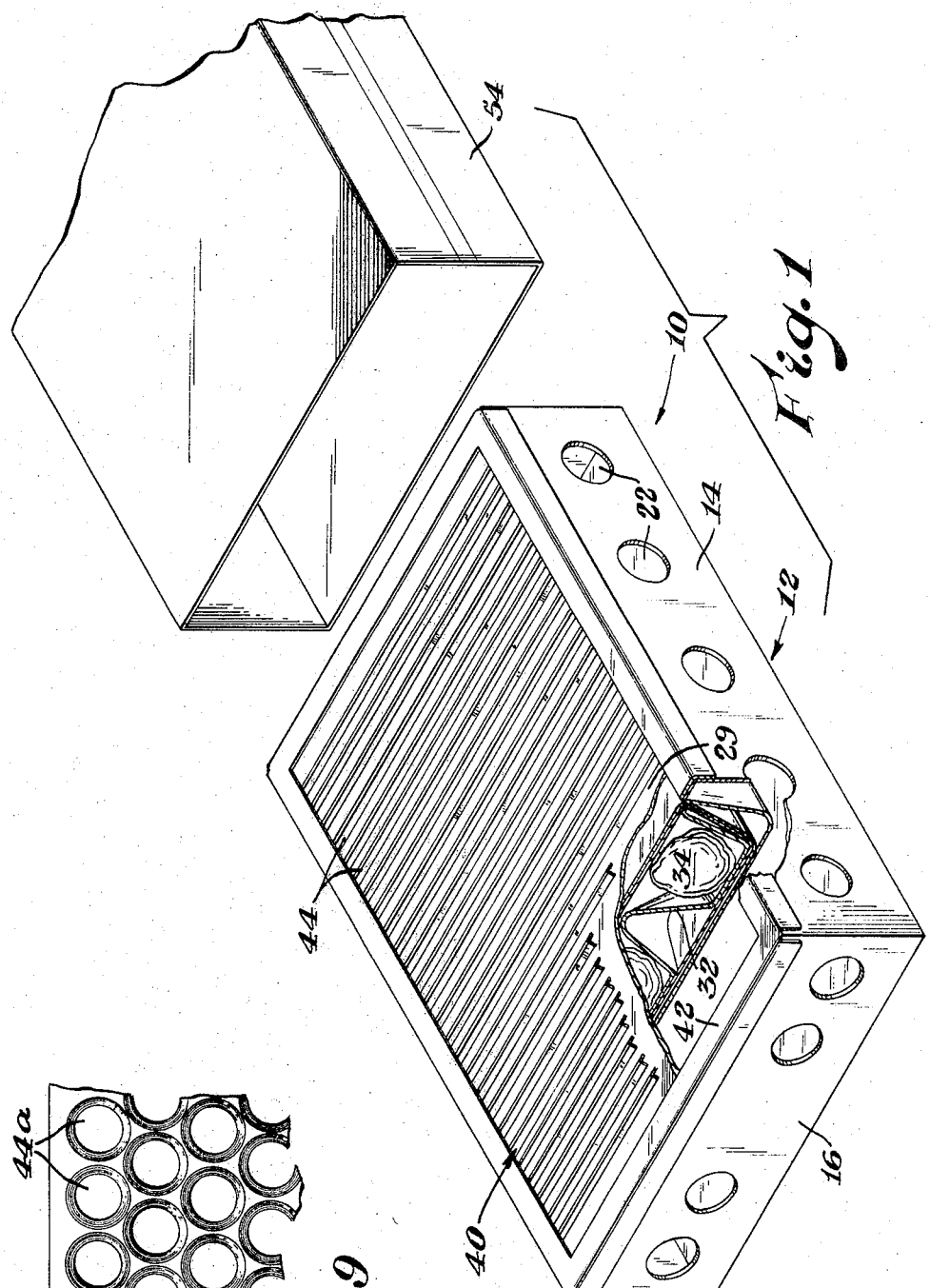
INVENTOR.
Robert F. Anderson
BY Earl D. Ayers
AGENT Nov. 21, 1967  R. F. ANDERSON  3,353,527
GRILLING APPARATUS Filed Oct. 21, 1965  3 Sheets-Sheet 2

INVENTOR.
Robert F. Anderson

BY Earl D. Ayers
AGENT

Nov. 21, 1967    R. F. ANDERSON    3,353,527
GRILLING APPARATUS
Filed Oct. 21, 1965    3 Sheets-Sheet 3
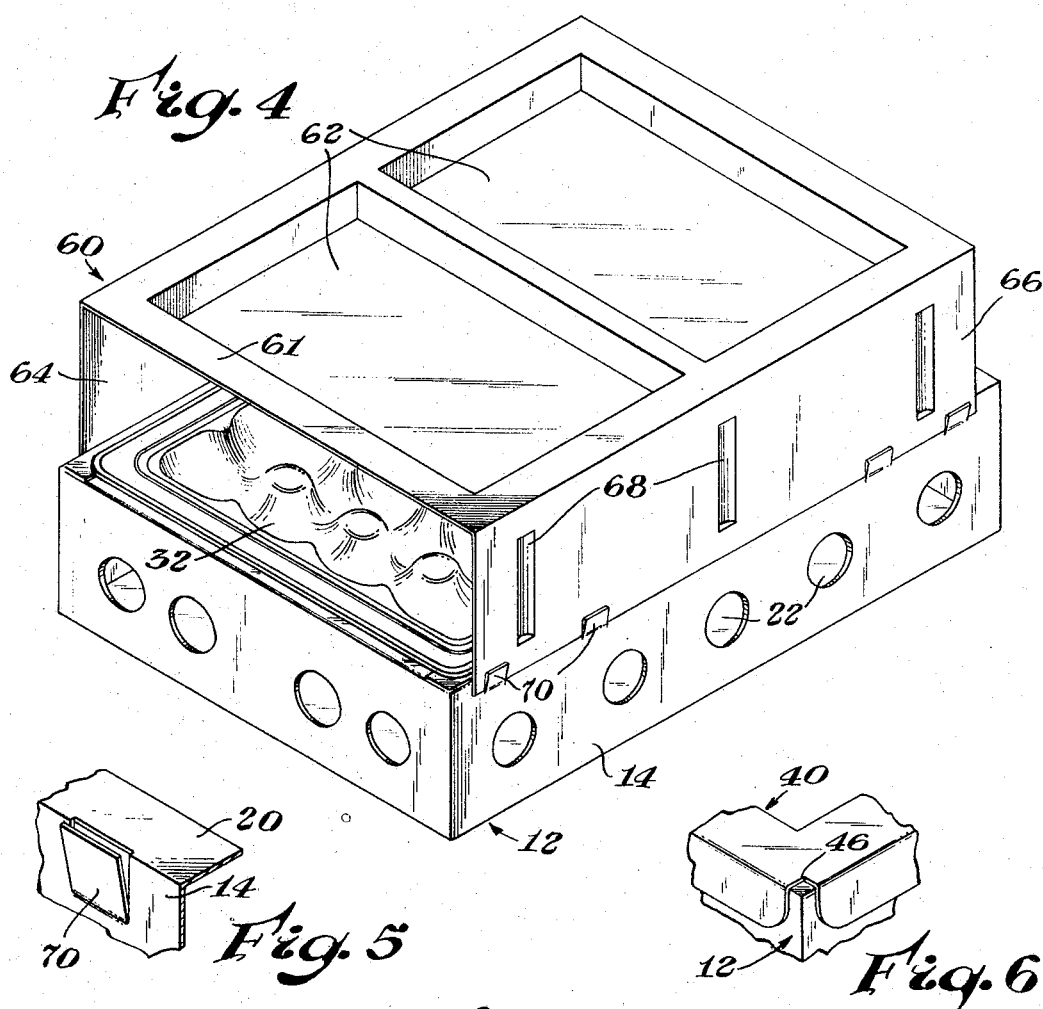
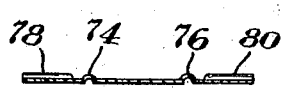
INVENTOR.
Robert F. Anderson
BY Earl D. Ayers
AGENT

United States Patent Office 3,353,527
Patented Nov. 21, 1967

3,353,527
GRILLING APPARATUS
Robert F. Anderson, Midland, Mich., assignor to Imagineers Corporation, Midland, Mich., a corporation of Michigan
Filed Oct. 21, 1965, Ser. No. 499,392
12 Claims. (Cl. 126—25)

ABSTRACT OF THE DISCLOSURE

Portable disposable grilling apparatus having a paper-like open top box-like member as a base, a metal tray supported by the upstanding edges of the base, fuel elements disposed in the metal tray and a foraminous grill element or cooking surface supported on the edges of the tray. The box-like base is provided with air circulation apertures formed therethrough its walls and the bottom and sides of the metal tray are spaced apart from the bottom and sides of the box-like base. A flue member formed of metal foil may be provided around the fuel elements in the metal tray and used to enhance initial burning of the fuel. The box-like base may be provided with a pack of plates of cutlery quick-detachably coupled to an aperture at the bottom of the base.

---

This invention relates to grilling apparatus and particularly to portable grill apparatus of the charcoal type which are especially adapted for single time usage.

The gathering together of grill, charcoal, utensils and associated equipment prior to having a picnic often involves a substantial effort on the part of the person organizing an outing or so-called cook-out.

Grills are usually bulky or require special care in locating them at the picnic site or in using them. Handling of the charcoal fuel is messy, and ignition of the fuel, while capable of accomplishment, is sometimes difficult to achieve, especially uniform ignition of the body of fuel.

The cleaning up and moving of a hot grill after a picnic or cook-out is also a problem.

Accordingly, a principal object of this invention is to provide improved grilling apparatus.

Another object of this invention is to provide improved grilling apparatus which is disposable after usage.

A further object of this invention is to provide improved grilling apparatus which has self-contained fuel, is light in weight and compact in size.

Still another object of this invention is to provide improved grilling apparatus which has means incorporated therein to aid ignition of the fuel.

A still further object of this invention is to provide portable grilling apparatus which includes means for baking and/or frying as well as grilling food thereon.

An ancillary object of this invention is to provide a packaged grilling unit which has means therein for containing picnic type plates and cutlery.

In accordance with this invention, there is provided grilling apparatus of generally rectangular box-like configuration including a slidably removable outer cover and an inner grilling assembly.

The grilling assembly includes a hollow box having a bottom and sides, a metal tray adapted to fit over and be supported by the open top part of the box, fuel containing and ignition means disposed in the tray, and at least a grill element adapted to be supported from the edge part of the tray above the fuel.

The invention, as well as additional objects and advantages thereof, will best be understood when the following detailed description is read in connection with the accompanying drawings, in which:

FIG. 1 is an isometric view, partly broken away and in section, of grilling apparatus in accordance with this invention;

FIG. 4 is an isometric view of a grill assembly in accordance with this invention with a baking or frying device attached thereto;

FIG. 5 is a fragmentary view showing, on an enlarged scale, tab means on the box of the assembly of FIG. 4 whereby the baking of frying device may be attached;

FIG. 6 is a fragmentary view, on an enlarged scale, showing an embodiment of corner construction for the grill element;

FIG. 7 is a plan view of a spatula-turner-spacer element adapted for use with this apparatus;

FIG. 8 is a sectional view taken along the line 8—8 of FIG. 7; and

FIG. 9 shows, in fragmentary plan view, the configuration of an alternative grill element adapted to fit in said grilling assembly.

Figure 2:
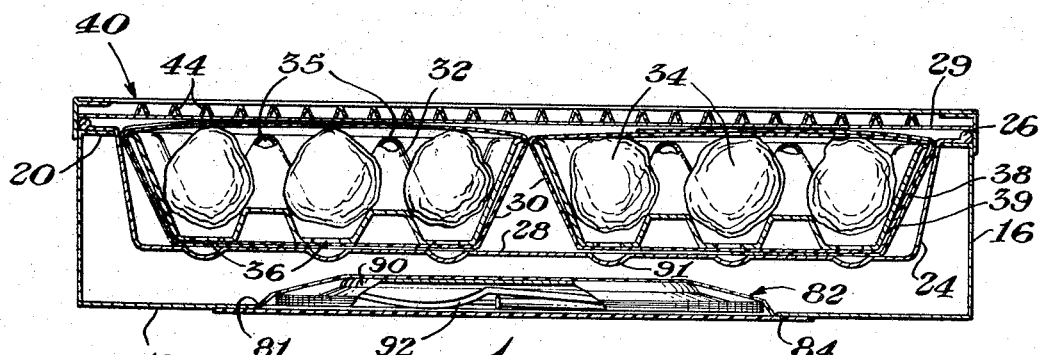
FIG. 2 is a vertical sectional view taken longitudinally of apparatus in accordance with this invention.

Referring to the drawing, and particularly to FIGS. 1 and 2, there is shown grilling apparatus, indicated generally by the numeral 10, comprising a hollow box 12, usually made of cardboard, having side walls 14, end walls 16, bottom 18, and a narrow flange 20 extending inwardly from said side walls 14 and end walls 16 at the open upward side of the box 12. The side and end walls may contain a plurality of apertures 22 therein to permit air flow through the box 12 during use, thus cooling the box 12.

A metal tray 24, usually pressed from a thin sheet of metal such as aluminum, fits in the box 12 with its rim 26 resting on the flanged edge part 20. The depth of the tray 24 is such that its bottom 28 is spaced from the bottom 18 of the box and from any other contents of the assembly which may be stored in the box, but is deep enough to contain, below its rim 26, a carton or cartons 30 having shaped sections 32 adapted to contain and position fuel elements 34, such as charcoal briquets, for example, therein. The various sections 32 may, if desired, also be provided with bores 36 at their lower parts to facilitate the circulation of air around the fuel during the consumption of the fuel. Likewise, it is advantageous to provide bores 35 at the apices of the sections 32 to facilitate lighting the sections 32 and also to provide improved air circulation through the ignited sections 32.

The carton or cartons 30, with the fuel elements therein, may conveniently be packaged with a membrane-like skin 38 of flammable material such as cellophane, for example, to prevent the escape of dust from the fuel elements into the remainder of the assembly. The skin 38 is, of course, penetrated before ignition of the fuel elements.

A flue element 39, made of metal foil, is disposed partly under the cartons 30 and extends around the sides and partly over the top of the cartons 30. The flue 39 is raised (unfolded upwardly) with the grill element 40 removed while the fuel is being ignited.

The grill element 40, usually pressed from thin sheet metal stock, fits closely over the rim 26 of the tray 24. The grill element 40 has an edge structure 42 of angular configuration when viewed in cross section to assist in supporting and positioning it around the rim of the tray 24, and has bar-like elements or cross members 44 extending in a parallel array from side to side along the length of the element 40.

The grill element 40 is adapted to be stamped from a single sheet of flat sheet metal stock, such as aluminum, for example. As shown especially in FIG. 6, it may be seen that the corners 46 of the grill element 40 have been cut so that no overlapping or pointed edges appear in the stamped element.

As may be seen in FIG. 1, a hollow tubular sleeve 54, shaped to fit closely but slidably over the grill assembly, is provided. Though not shown, commercial examples of sleeves or covers 54 usually include illustrations of use of the assembly, directions for use, or recipes useful with the assembly.

FIG. 4 illustrates the use of a reflective oven-dish utensil 60 in accordance with this invention. The utensil 60 comprises a sheet of metal bent to form a base surface 61 having at least one and usually two depressions 62 therein and a pair of side elements 64, 66 extending downwardly (in the direction of the depressions 62) generally perpendicularly with respect to the base surface 61.

The side elements 64, 66 usually, but not necessarily, have a plurality of spaced apart small stiffener ribs 68 extending transversely downwardly across the side elements 64, 66.

As shown in detail in FIG. 5 as well as in FIG. 4, the box 12 is provided with a plurality of tabs 70 spaced apart along the length of the box and formed out of the side walls 14 by a three-sided cut, the tabs receiving and supporting the side elements 64, 66 of the utensil 60 between the side walls 14 and the protruding tabs 70.

The depression or depressions 62 serve both as stiffener elements and as cooking dish elements. For example, while the utensil is being used as a reflective oven, other food may be cooked in the dish depressions 62.

Though not shown in FIG. 4 for the purpose of more clearly showing the configuration of the shaped sections 32 for containing and positioning the fuel elements, the grill element 40 is normally used with the assembly. The sections 32 are more or less frusto-pyramidal in shape, with the bases tending to overlap, the bases being adjacent to the bottom of the tray or pan 24. The sections 32 and the carton are made of a flammable material, usually fibrous, of the paper type commonly used in making egg cartons, for example. The flammable material may, if desired, be wax impregnated.

The spatula-tongs 72 illustrated in FIG. 7 and FIG. 8 are composed of an elongated strip of sheet metal, usually aluminum. The tongs 72 have elongated longitudinally extending grooves 74, 76 formed therein which serve as stiffener elements and transversely extending short crimps or grooves 78, 80 which extend part way across the tool and serve to provide a point where the tool may be bent to form a tong. The tool may also be used bent and edgewise to lay over the grill element 40 and then place a cooking utensil at a greater distance from the coals, preventing too rapid heating of the contents of the utensil.

Referring again to FIG. 2, it may be seen that the bottom of the box 12 has a cutout part 81 (usually circular) therein. A blister pack 82 containing plates 90 and eating utensils 92 is adapted to fit upwardly within the cutout part 81, with the rim 84 of the pack below the bottom 18 of the box 12. The blister pack is held in place before use of the assembly by means of the sleeve 54.

Figure 3:
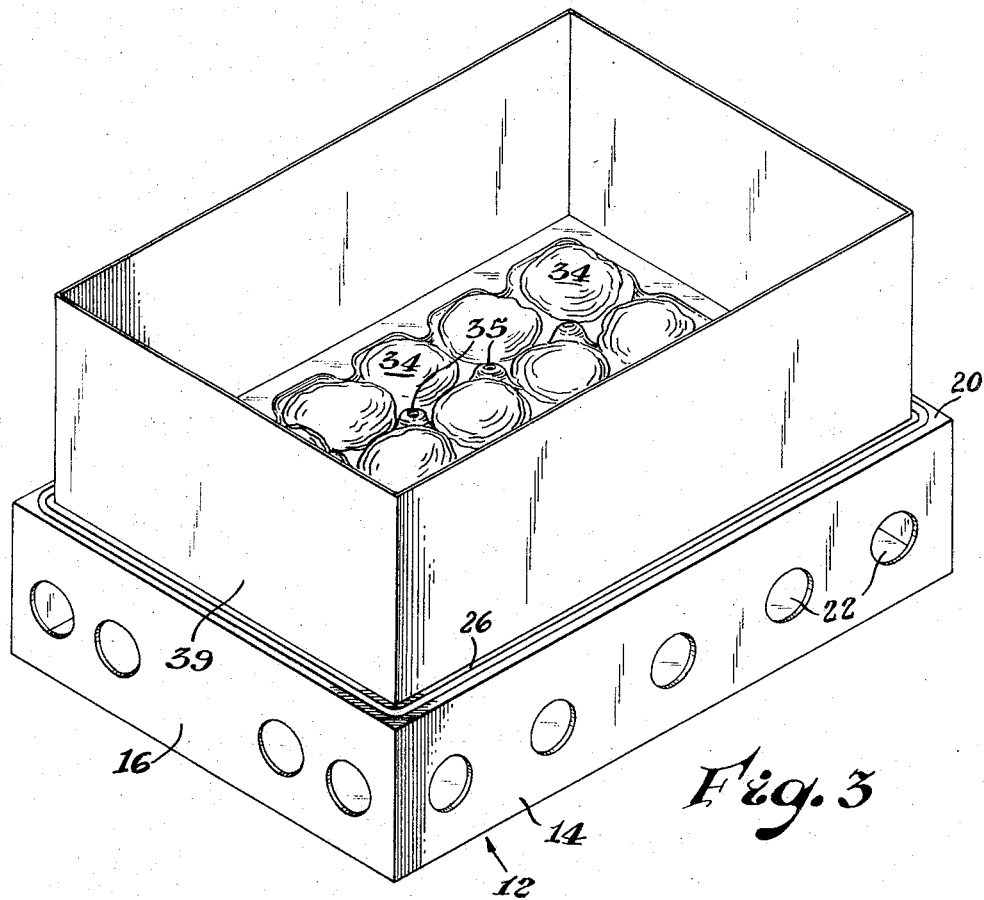
FIG. 3 is an isometric view of apparatus in accordance with this invention shown with the flue unfolded.

In operation, the box 12 is removed by sliding it from the sleeve 54. The blister pack 82 is removed from the bottom of the box 12. The grill element 40 is then removed, exposing the flue element 39 which is unfolded to form a vertical flue as shown in FIG. 3. The flammable carton or cartons 30 are then ignited after puncturing any protective film covering 38, for example, as with a match.

After all the charcoal is ignited, the flue element 39 may be torn away, then the metal grill element 40 is replaced, leaving the grilling apparatus as a neat asembly which is ready for use.

In some embodiments of this invention the oven-dish utensil or attachment 60 may have been telescoped over the basic grill assembly and held thereto by the cover or sleeve 54. If it is desired to use the oven-dish attachment 60, it is attached along the lower edges of its sides to the box 12 by means of the tabs 70.

The box 12 may be made of paper board, and preferably, but not necessarily, has a fire retardant material applied at least to the inwardly extending flanged part 20.

Referring to FIG. 9, there is shown, in plan, a fragmentary view of a grill element 40a in which the bars 44 of the grill element 40 (FIGS. 1 and 2) are replaced by an array of bores 44a having depressed dimpled parts surrounding them, thereby forming a more or less rigid structure. This array, with the dimples surrounding each bore being almost contiguous with those of the adjacent bores, have advantages over grill elements using the parallel bar-like elements or cross members 44. For example, a turner utensil may be pressed across the grill from any direction without snagging on the grill surface.

After the use of the grill is completed, the assembly may be discarded in a trash container. As a safety precaution, the pan or tray 24 is filled with water and then drained by holding the assembly along the rim of the grill and pouring the water therefrom.

The assembly is economical to make, light in weight, and easy to use and dispose of.

The grooves 91 in the bottom of the tray 24 provide means for air to circulate around the fuel elements, aiding in the ignition of the fuel elements. Also, the reflectively of the foil of the flue element 39 aids in heating the fuel elements 34 during their initial lighting and causes more rapid overall ignition of the fuel elements than would occur if a non-reflective foil were used. On the other hand, the under part of the foil flue element 39 prevents, by its reflectivity, excessive heating of the tray 24.

Also, usually a cardboard instruction or recipe sheet 29 (FIG. 1 and FIG. 2), is packed immediately under the grill 40. The sheet 29 is, of course, removed before igniting the fuel elements.

What is claimed is:

1. A disposable grill assembly comprising
 (a) a box-like member having end walls, side walls, a bottom, and an open top, said box-like member being formed of paper-like material and having air circulation apertures formed therethrough said walls;
 (b) a metal tray having a bottom, side and end walls, and an outwardly extending rim, said rim extending over said top of said box-like member, and the bottom and walls of said tray being spaced apart from the bottom and walls of said box-like member;
 (c) an array of fuel elements, said fuel elements being disposed in said tray; and
 (d) a foraminous grill element coupled to and supported from a peripheral section, said peripheral section being adapted to fit over said rim of said tray.

2. A grill assembly in accordance with claim 1, wherein said array of fuel elements are disposed in pre-formed carton-like spacer means which is ignitable to induce ignition of said fuel elements.

3. A grill assembly in accordance with claim 1, wherein said grill element is a metal stamping.

4. A grill assembly in accordance with claim 1, wherein said foraminous grill element has parallel cross members which are generally V-shaped in transverse cross-sectional configuration.

5. A grill assembly in accordance with claim 1, wherein pre-packaged plates and cutlery are quickly-detachably coupled to the bottom of said box-like member between the box-like member and the bottom of said pan.

6. A grill assembly in accordance with claim 1, wherein a foil-like detaachable flue is disposed between said array of fuel elements and the side of box-like member, said flue extending above said box-like member and being adapted to be folded over said fuel elements until used.

7. A grill assembly in accordance with claim 1, wherein said assembly includes a reflective oven member which is attached to said box-like member.

8. A grill assembly in accordance with claim 1, wherein said fuel elements are a charcoal based product.

9. A grill assembly in accordance with claim 1, wherein said box-like member has an inwardly extending flange at its top.

10. A grill assembly in accordance with claim 1, wherein said box-like member is surrounded by a sleeve-like cover.

11. A grill assembly in accordance with claim 1, wherein said grill element has an array of holes therein in the part thereof disposed above said fuel elements and said cover is dimpled downwardly from its top surface at each of said holes.

12. A grill assembly in accordance with claim 2, wherein said spacer means has an array of perforations therethrough.

References Cited
UNITED STATES PATENTS

| | | | |
|---|---|---|---|
| 2,910,930 | 11/1959 | Hankoff | 126—9 |
| 2,965,096 | 12/1960 | Barton | 126—25 |
| 2,981,249 | 4/1961 | Russell et al. | 126—25 |
| 3,191,591 | 6/1965 | Bennett | 126—25 |
| 3,199,438 | 8/1965 | Myler et al. | 99—421 |
| 3,276,440 | 10/1966 | Sazegar | 126—25 |
| 3,279,453 | 10/1966 | Norehad et al. | 126—25 |

FREDERICK L. MATTESON, JR., *Primary Examiner.*

E. G. FAVORS, *Assistant Examiner.*